Patented Jan. 6, 1942

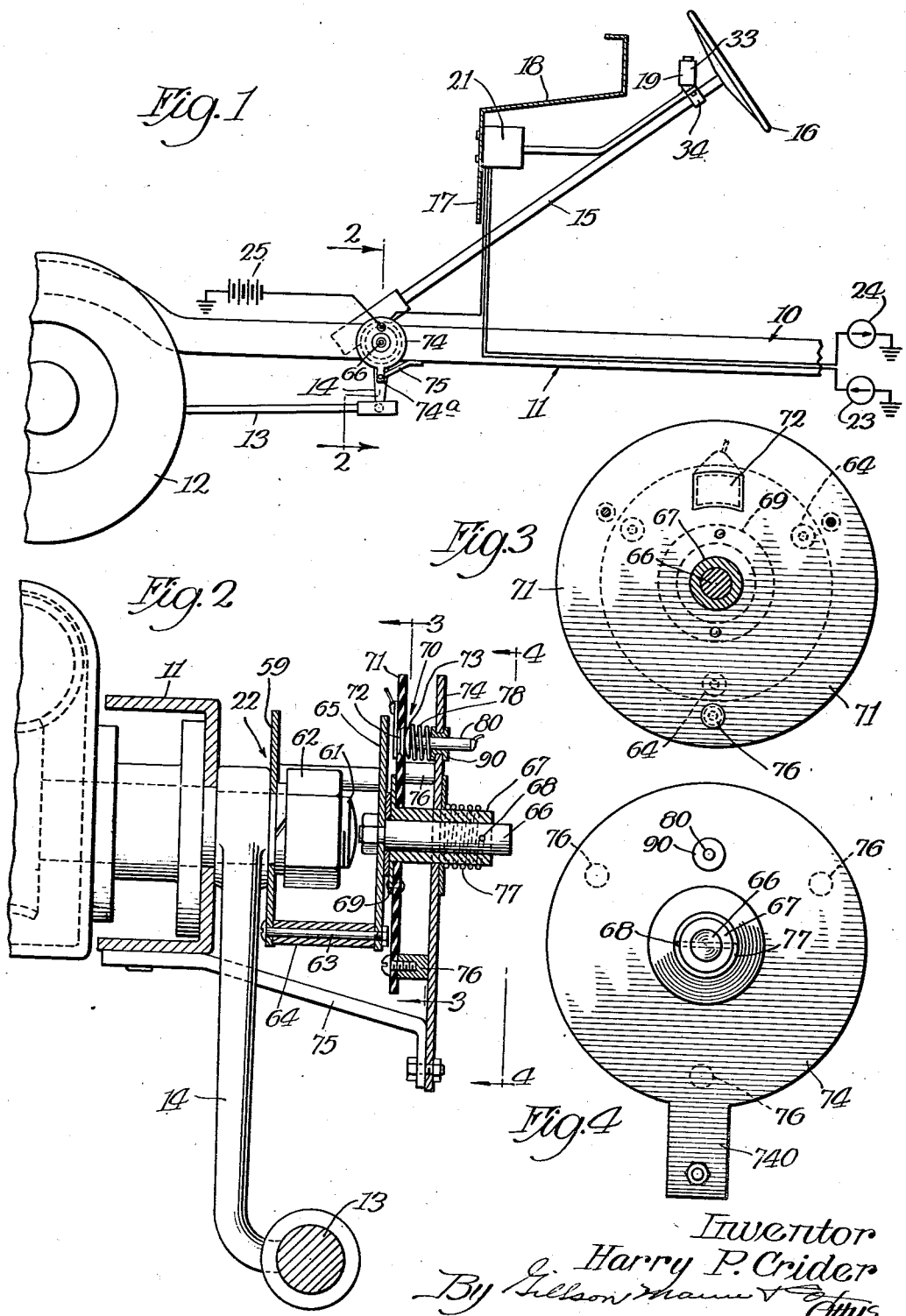

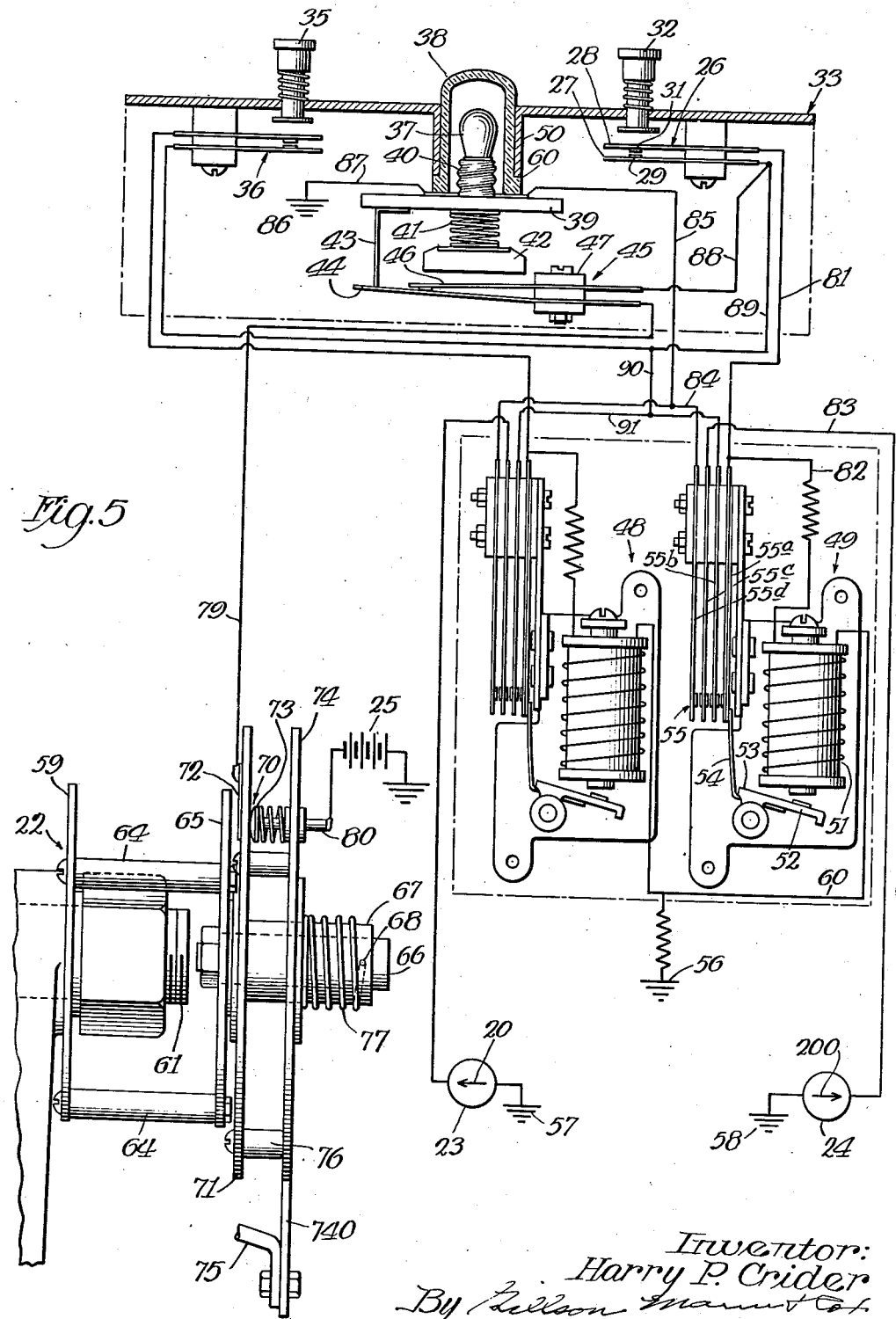

2,268,545

UNITED STATES PATENT OFFICE 2,268,545

SIGNAL DEVICE

Harry P. Crider, Chicago, Ill.

Application November 29, 1937, Serial No. 176,981

2 Claims. (Cl. 177—339)

This invention relates to signal devices and more especially to signal devices for use on vehicles such as automobiles, boats, airplanes and like vehicles for indicating the direction of turning prior to and during at least a portion of the turning operation.

One of the objects of the invention is the provision of mechanism for a motor vehicle for indicating the direction in which it is intended to turn the same prior to the actual turning together with novel means for automatically terminating the signal or for rendering the same inoperative during the turning operation.

A further object of the invention is the provision of a new and improved signalling device having manual means for initially operating the same and provided with automatic means for causing the termination of the signal when the vehicle has begun its turning movement.

A still further object of the invention is the provision of a new and improved signal device that is under manual control at all times but is so constructed that the signal is rendered operative under manual control, remains automatically operative and that is automatically rendered inoperative.

A further object of the invention is the provision of a new and improved signal mechanism that is in the form of an attachment that may be applied to any vehicle at a minimum of time and expense.

Another object of the invention is the provision of a new and improved signal mechanism that is inexpensive to manufacture, easily installed, that is positive and reliable in action, efficient in operation, and that is not likely to become broken or get out of order.

Other and further objects and advantages will appear from the following description taken in connection with the accompanying drawings, in which—

Fig. 1 is a side elevation of an automobile, showing parts broken away and parts omitted for the sake of clearness and showing the invention in position thereon;

Fig. 2 is a section on the line 2—2 of Fig. 1;

Fig. 3 is a section on the line 3—3 of Fig. 2;

Fig. 4 is a section on the line 4—4 of Fig. 2; and

Fig. 5 is a diagrammatic view of the signalling device and the wiring therefor.

Numerous devices have been proposed for motor and other vehicles for indicating to a following vehicle the direction in which the leading vehicle is about to turn. Some are entirely automatic in their operation while others are wholly manually controlled. The former are objectionable because the signal is not given before the turning operation begins and the latter are objectionable because it either requires the hand continuously on the control while turning or it takes presence of mind to remember to de-energize the signal after the turn is made, depending on the type of signal employed. Most drivers will think to operate a manually operated signal when they intend turning but will forget to de-energize the signal when it is no longer required.

There is, of course, a third class of signals that is connected to be operated by the service brake but this type merely indicates that the driver is going to stop or intends to turn but does not indicate the direction in which the vehicle is to be turned.

The present invention seeks to remedy these difficulties by the provision of a new and improved construction in which the manual control is operated for energizing the signal and when once energized will remain so until it is de-energized by mechanism automatically operated upon the turning of the vehicle. The signal may also be de-energized by manually controlled means, if desired.

Any suitable mechanism, either mechanical or electrical may be employed. In order to disclose one embodiment of the invention, the same is shown and described as being electrically operated.

Referring now to the drawings, the reference character 10 designates an automobile having the chassis 11, the front wheels 12, the steering link 13, steering arm 14, steering column 15 and the steering wheel 16. The vehicle is also provided with the usual dash 17 and cowl 18. A more detailed description appears to be unnecessary.

The signalling device is in the form of an attachment which may be constructed as regular equipment for the car or may be in the form that may be readily applied to any car. This attachment comprises a control mechanism or control box 19 which may be detachably connected to the steering column, relay mechanism or switch box 21, which may be detachably connected to the dash, and switch mechanism 22 detachably connected to the steering mechanism. The signal lamps or elements are shown at 23 and 24. These lamps are adapted to be mounted at the rear of the vehicle, one at each side thereof, or preferably, both are mounted in a casing at the rear of the car. In some instances, a pair is mounted on the front and another at the rear, the corresponding signals being connected in series. The signals are provided with suitable indices indicating direction such as the arrows 20 and 200, Fig. 5, and when energized will indicate whether the driver of the vehicle is intending to turn to the right or to the left. The signalling mechanism is so constructed that it is manually controlled for energizing the signals and mechanism is provided for automatically maintaining the signal in energized condition and for automatically de-energizing the signal device during the turning of the vehicle.

In the form of the construction selected to illustrate one embodiment of the invention, electrically operated mechanism is employed for this purpose. As shown, the signal lamps 23 and 24 are adapted to be energized by a current from the conventional battery 25 with which the vehicle is equipped. The circuits for energizing the signals are manually controlled by the control mechanism 19 as will now be described.

This mechanism, see Fig. 5, comprises a control box or casing 33 within which are mounted the switches 26 and 36, one of which controls the signal 24 for indicating a right turn and the other the signal 23 for indicating a left turn as will presently appear. Since they are alike, only one need be described.

Referring to the switch 26, for convenience of description, it is represented by two resilient metal blades 27 and 28, Fig. 5, having contact members 29 and 31 thereon. The circuit is closed by forcing the blade 28 toward the blade 27 so as to cause the contacts 29 and 31 to engage. In the form of the construction shown, this is accomplished by means of a spring-pressed push button 32 which extends through the upper wall of the casing 33 for the control mechanism. The casing 33 is adapted to be detachably attached to the steering column 15 at the upper end thereof as by means of a clamp 34. The part is so mounted beneath the wheel that the button will be convenient to the hand of the operator while steering the vehicle. It is preferably so located that it is accessible above the hub of the wheel and is so mounted that the buttons of switches may be reached and pressed by the fingers of the operator without removing the hands from the wheel or the spokes thereof while steering. A second push button 35 and the switch mechanism 36 are also mounted at the opposite end of the control casing 33 as shown more clearly in Fig. 5 of the drawings.

An indicator or pilot lamp 37 and its transparent casing 38 are mounted between the push buttons 32 and 35 and is so arranged and wired that it is energized to indicate to the driver that one or the other of the signal devices 23 or 24 is in operation. The indicator lamp and casing are mounted on the casing 33 and extend through the upper wall thereof and the parts are so constructed that they constitute a switch for opening the circuit when the indicator lamp casing 38 is forced inwardly by the operator, as will presently appear. As shown, the lamp is mounted in a socket 40 on a base plate 39 and the casing 38 for the lamp extends outwardly through a sleeve 50 secured in the casing 33. The casing 38 is preferably of colored glass and is provided with a shoulder 60 for engaging the sleeve 50 for limiting its outward movement. The casing 38 constitutes a push button for operating a master switch 45 for opening the circuit through the battery and, of course, through either or both signal lamps as well as through the pilot or indicator lamp 37, as will presently appear. The indicator lamp is held in extended position by a spring 41 which rests on an abutment 42 rigidly mounted in the casing 33.

The base plate 39 is provided with an inwardly extending finger 43 which is adapted to engage the inner blade 44 to open the switch 45. The switch 45 has the blades 44 and 46 as shown in Fig. 5. The two blades 44 and 46, constituting the switch 45, are insulated from each other at one end as at 47.

The switches 26 and 36 are adapted to close the circuit through the relay mechanisms 48 and 49 which, in turn, are adapted to open and close the circuit through the signal lamps or other devices 23 and 24, as will presently appear. Each relay or relay mechanism comprises an electromagnet 51 having a pivoted armature 52 which in turn is provided with a cam 53 for engaging a corresponding cam engaging resilient arm 54 for closing a multiple switch 55. The multiple switch 55 comprises a plurality of spring blades 55a, 55b, 55c and 55d that are insulated from each other and from the spring or resilient arm 54. The resilient arm 54 returns the armature 52 to the position shown in Fig. 5 when the magnet 51 is de-energized. Since the relay 48 is substantially the same as that shown at 49, it is not thought necessary to repeat the description. The relays are grounded as at 56 and the signal devices are grounded as at 57 and 58.

Suitable means are provided for automatically opening the circuit through the relays and the signal lamps when the vehicle has been turned through a predetermined angle. Any suitable means may be employed for this purpose. In the form of the construction shown, switch mechanism 22 having the switch 70 controlled by the steering shaft 61 is employed for this purpose. This mechanism comprises an attaching plate 59, Fig. 2, having an opening therein for receiving the bolt or steering shaft 61 to which the steering arm 14 is rigidly secured. By removing the nut 62, which moves with the steering arm, the plate 59 is clamped in position to turn with the shaft 61. Rigidly attached to the plate 59 as by means of bolts 63 and spacing sleeves 64, is a positioning plate 65 moving with the plate 59.

Rigidly mounted on the plate 65 and extending outwardly therefrom is a stud 66 on which is mounted a sleeve 67 which in turn is rigidly attached thereto as by means of the pin 68. The sleeve 67 is provided on its inner end with a radially extending flange 69 which in turn is riveted to an insulating disk 71 as shown more clearly in Fig. 2 of the drawings. The disk 71 has mounted thereon, one contact member 72 of the switch 70 which is adapted to normally contact a spring-pressed terminal 73 constituting the other member of the switch 70. The contact member 73 is carried by a spring-pressed rod 80 slidable through an eye 90 secured in an opening in the disk. The terminal 73 is carried by a plate 74 loosely mounted on the sleeve 67. The plate 74 is held from rotation by any suitable means such as the brace 75 attached to a depending arm 740 on the plate 74 and to the chassis frame 11 of the car, Fig. 2. The contact member 72 is somewhat elongated, Fig. 3, and extends circumferentially of the disk 71. The disk 71 may have a plurality of spacer members 76 for engaging the plate 74 for positioning the plate 71. The plate 74 is held inwardly against the spacer member 76 by a spring 77 on the sleeve 67. The contact member 73 is spring-pressed as by means of the spring 78.

In the operation of the vehicle, the switch 70 is normally closed. The circuit is opened by the turning of the steering arm 14 when the same passes beyond a predetermined angle. This movement will rotate the disk 71 carrying with it the contact member 72 which will turn out of engagement with the contact member 73 thus opening the switch 70. It has been found by experiment that satisfactory results are obtained when the contact member 72 is of such length or extent that the contact member 73 will disengage the same when the arm 14 has been turned through about 10 degrees. They are located at such a distance from the axis of the rotating part that this contact member is not of such great extent in length. It will thus be seen that if the circuit through the switch 70 and the signal lamp be closed that when the vehicle is turned, the circuit will be opened by the switch 70.

The circuits for energizing and de-energizing the signals may be more easily explained by tracing the same which are as follows:

When it is desired to energize the signal indicating that the driver intends to turn to the right, for instance, he presses the button 32 on the control box 19, Fig. 5, at the proper time for energizing the magnet 51 and current from the battery 25 will pass through the switch 70 into the conductor 79, Fig. 5, and from thence through the switch 45, conductor 88, through the switch 26, which has been closed by pressing the button 32, and from thence through the conductor 81 and a shunt 82 into the coil of the electromagnet 51 and through the conductor 60 to the ground 56 thus energizing the magnet 51. When the magnet 51 is energized, the circuit will be closed through the signal lamp 24 through two circuits, one through the switch 26 and one around this switch. The one through the switch 26 and to the conductor 81 is traced as before.

When the armature 52 is moved to close the circuits through the multiple switch 55, a portion of the current may be traced from 81 through the blade 55a, through the contact members to the blade 55c, through the conductor 83, through the signal 24 to the ground. A portion of the current will pass into the blade 55d, the conductor 84 and the conductor 85, into the lamp 37 for energizing the same and from thence to the ground 86 through the conductor 87.

When the button 32 is released, the current will then flow from the battery 25, through the switch 70, conductor 79, switch 45, conductors 88, 89, 90 and 91 to the blade 55b, where it divides, a part going through the blade 55c, conductor 83, to the signal lamp 24, and a part passing from 55b to the blade 55a, the shunt 82 and the electromagnet 51 for energizing the same, conductor 60 and to the ground 56.

The current may be traced in a similar manner when the button 35 is pressed for energizing the light 23 for indicating the intention of the operator to turn to the left. Since the wiring is substantially the same, it is not thought necessary to repeat the tracing of the current through this mechanism.

It will thus be seen that the circuit through the signal lamp or element 24 and through the indicator lamp 38 will continue to be energized even though the button 32 be released.

During the turning operation, as soon as the vehicle is turned through the proper angle, that is, when the steering arm 14 is moved through a predetermined angle, the contact 73 will pass from the contact plate 72 thereby opening the circuit through the corresponding relay magnet 51 whereupon the spring arm member 54 will move the armature to the position shown in Fig. 5 in position for the next operation.

Should the turn not be sufficient to open the circuit through the switch 70, or should the operator operate one of the buttons and then change his mind about turning, or if, for any reason, either or both signals 23 and 24 are energized and it is desired to de-energize them, this may be done by pressing on the button 38 which constitutes a housing for the lamp. When this button 38 is depressed, the circuit will be opened through the switch 45 and this will de-energize the electromagnet or relay magnet thus permitting the parts to be restored to their normal inoperative positions.

It will thus be seen that for each push button switch there is a relay mechanism that is energized and this in turn energizes a signal, consequently, the number of separate signals may be multiplied by multiplying the number of relays and push button switches. If, for instance, it may be desired to use such signal devices on aircraft to indicate a turn to the right or left, up or down, this may be done by increasing the number of signals, relays, and push buttons. By using an additional switch responsive to movement of the steering mechanism in steering in a vertical plane, signals indicating an up or down turning movement may be indicated by manually controlled mechanism and the parts automatically de-energized or rendered inoperative when the steering mechanism has been so operated.

It is thought from the foregoing taken in connection with the accompanying drawings that the construction and operation of my device will be apparent to those skilled in the art and that changes in size, shape, proportion and details of construction may be made without departing from the spirit and scope of the appended claims.

I claim as my invention:

1. In a motor vehicle having steering mechanism comprising a chassis frame, a steering column, a steering wheel at the upper end of said column and a steering arm shaft supported by said frame and movable in response to the movement of said wheel, the combination of mechanism for indicating the contemplated turning of said vehicle which comprises a signal element for indicating a contemplated right turn, a signal element for indicating a contemplated left turn, a single source of electrical energy for energizing said signals, a multiblade switch for each signal, the blades of each switch being of light spring metal and being insulated from each other at their bases and normally out of contact at their ends opposite their bases, an electromagnet for each multiblade switch, a casing supported adjacent to said steering wheel, a single contact indicator switch for each signal element in said casing and each having a manually operated spring pressed push button for engaging the corresponding switch for closing a circuit through the source of electrical energy and corresponding electromagnet for initially energizing said magnet, means operated by each electromagnet, respectively, for forcing the blades of the corresponding switch into electrical contact for closing a main circuit through said source and the corresponding signal element and for simultaneously closing a shunt from said main circuit through the electromagnet for maintaining the same energized, a master switch within said casing, a pilot light mounted on said master switch and having a transparent casing constituting a push button for said master switch for opening the main circuit through said source, said pilot being in series with one of the blades of said multiblade switch whereby when either indicator switch button is pressed, the pilot light and the corresponding signal light will be energized and will continue to be energized after the indicator switch button is released but may be deenergized by pressing on said transparent casing for opening the main circuit, and switch means mounted on said steering arm shaft and frame and operable by said shaft for opening said main circuit when said shaft moves through a predetermined substantial angle to either side of its normal position, said circuit and switches being so arranged and constructed that when the circuit through either of said signal lights and pilot light be opened, the lights will all remain deenergized until one of said indicator switch buttons is operated to close the corresponding circuit.

2. In a motor vehicle having dirigible wheels and mechanism including a steering arm shaft, a steering shaft and steering wheel thereon for steering said dirigible wheels, the combination of a signal device for indicating the direction of turning of said vehicle to either side, said device comprising a single source of electrical energy, a pair of signal elements for indicating right or left turning, respectively, of said vehicle, a multiple contact switch for each element, each switch comprising a plurality of resilient blades normally out of contact and insulated from one another, an electromagnet for each multiple contact switch, means operated by each of said multiple contact switches for closing a main circuit through said source, said multiple switch and the corresponding element, a casing secured on said steering shaft adjacent to said steering wheel, a hand operated single contact switch normally open, within said casing, for each signal element for closing a circuit through said source of electrical energy and electromagnet whereby when one of said hand operated single contact switches is closed, the corresponding electromagnet will be energized for closing a main circuit through the corresponding multiple contact switch and element and for closing a shunt circuit from the main circuit through said electromagnet for maintaining said element energized after said hand operated single contact switch is released, a manually operated master switch within said casing between said hand operated switches for opening the main circuit through either of said elements when the same is energized, a pilot light mounted on said switch and controlled thereby, means for supporting said casing adjacent to said wheel accessible to the operator of the vehicle, and means removably mounted on the outer end of said steering arm shaft for automatically opening the main circuit through said source of electrical energy and corresponding multiple switch, signal and pilot light when the steering wheels of said vehicle are turned through a substantial predetermined angle, the parts being so constructed and arranged that said signal and pilot lights will remain deenergized until the corresponding single contact switch is again operated.

HARRY P. CRIDER.